Jan. 18, 1938.                C. M. STITT                2,105,620
                            BOX MAKING MACHINE
                           Filed March 9, 1937            8 Sheets-Sheet 1
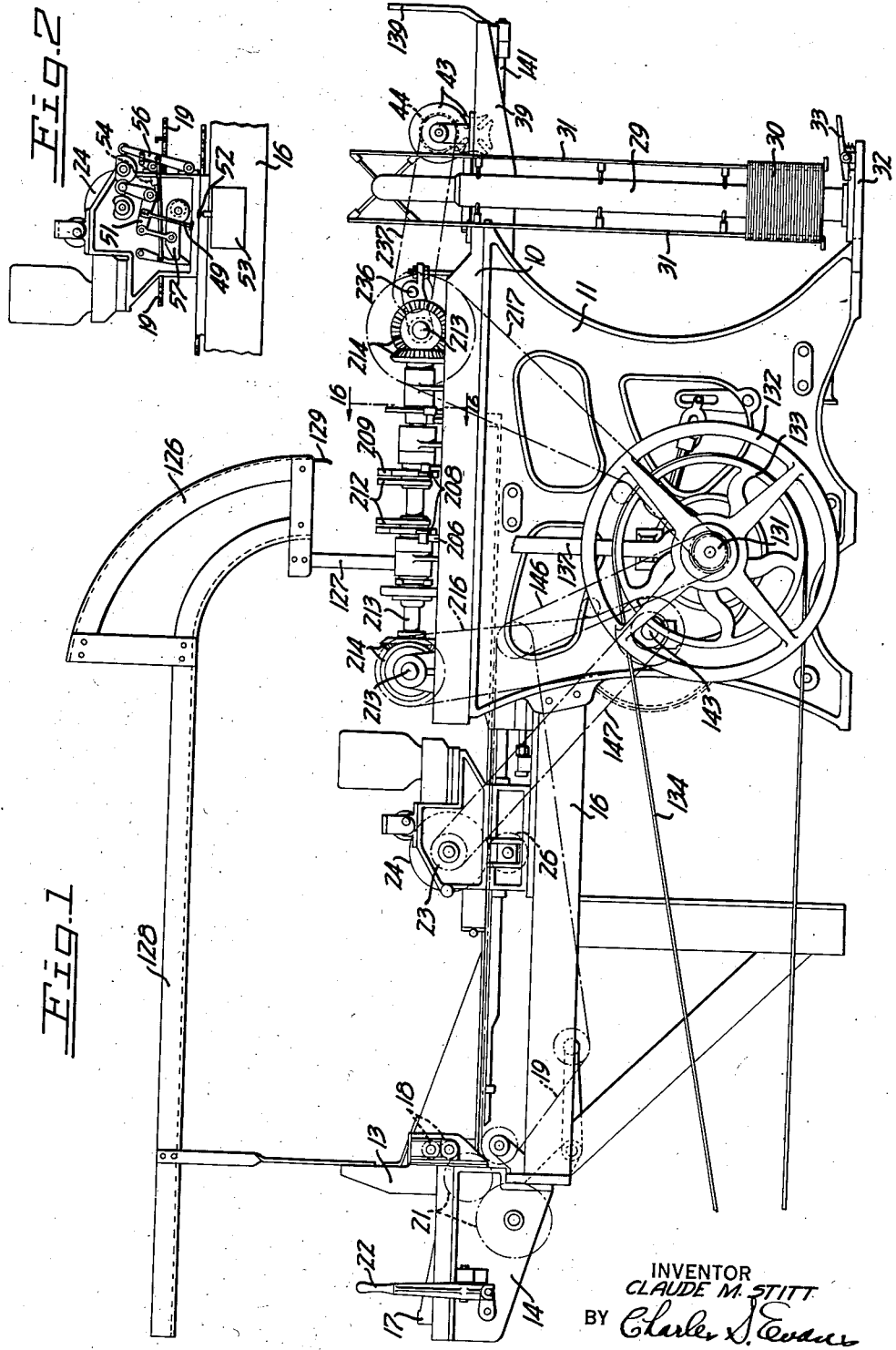
INVENTOR
CLAUDE M. STITT
BY Charles S. Evans
HIS ATTORNEY Jan. 18, 1938.　　　　　C. M. STITT　　　　　2,105,620
BOX MAKING MACHINE
Filed March 9, 1937　　　　8 Sheets-Sheet 2

Fig. 3

INVENTOR
CLAUDE M. STITT
BY Charles S. Evans
HIS ATTORNEY

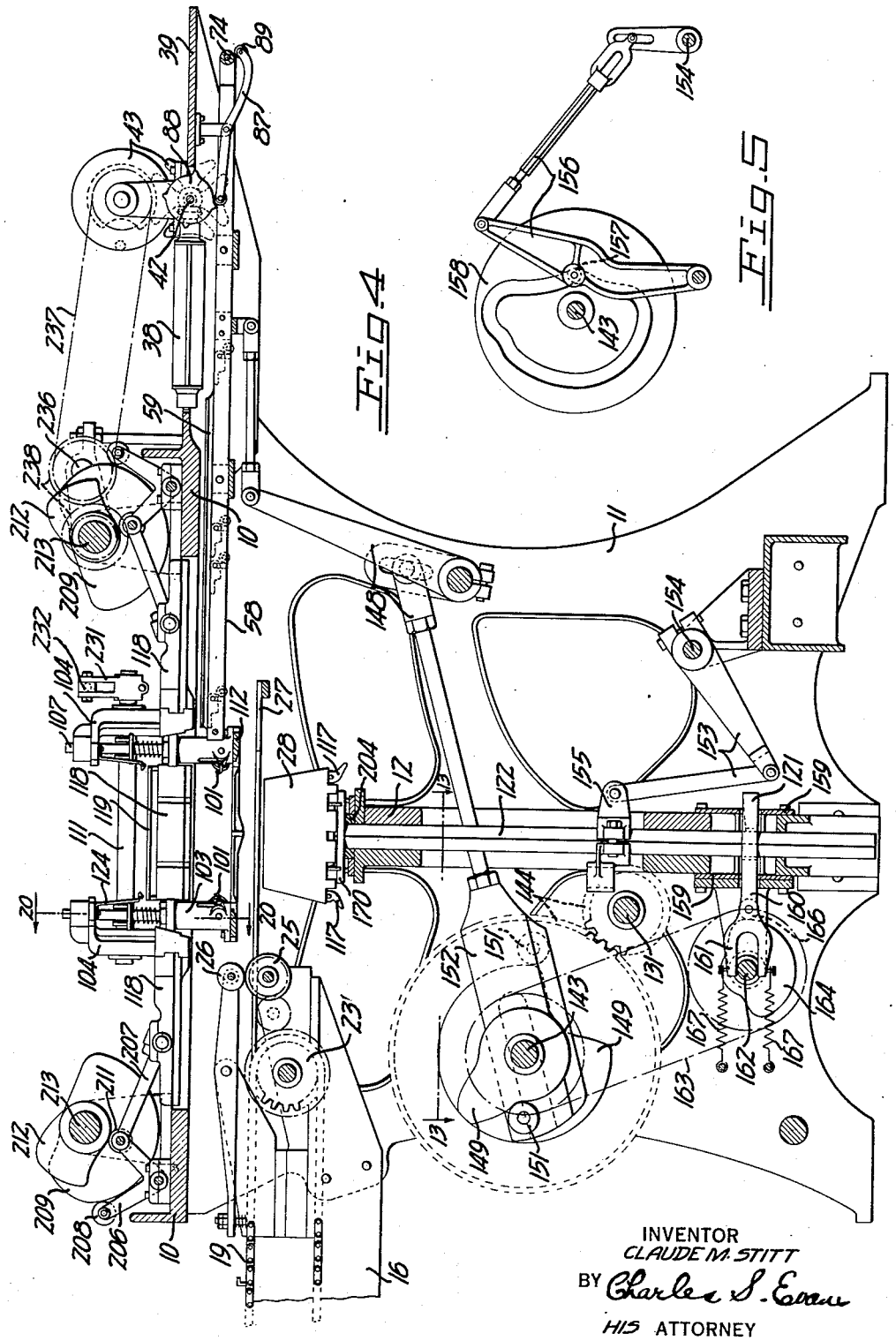

Jan. 18, 1938.   C. M. STITT   2,105,620
BOX MAKING MACHINE
Filed March 9, 1937   8 Sheets-Sheet 4
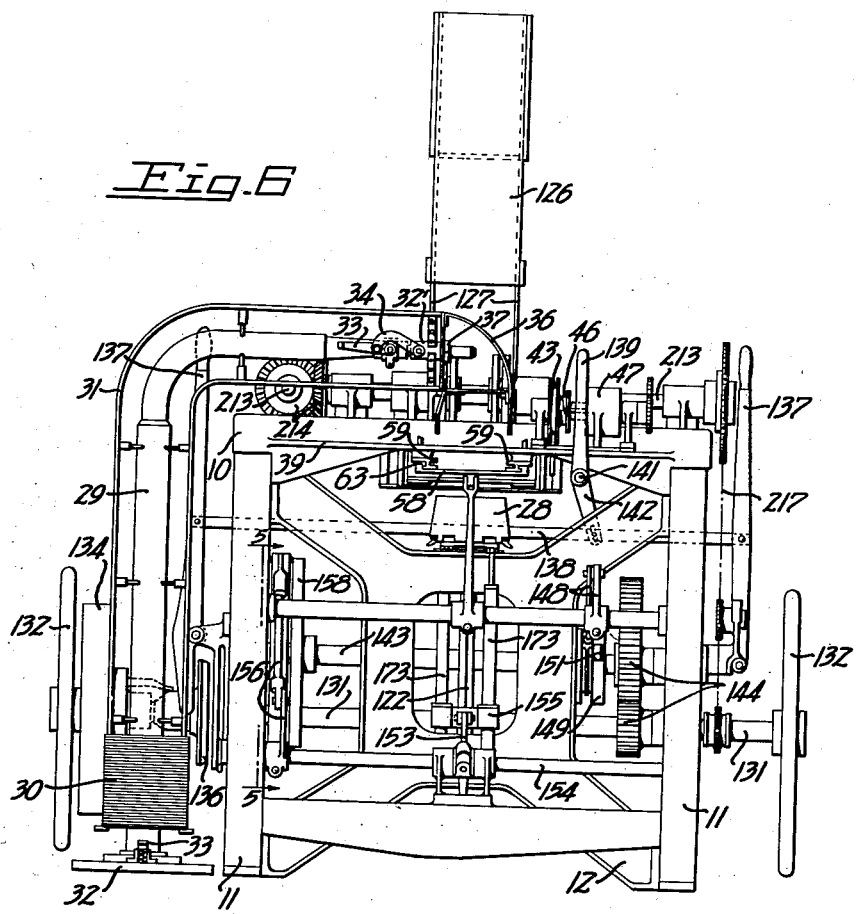
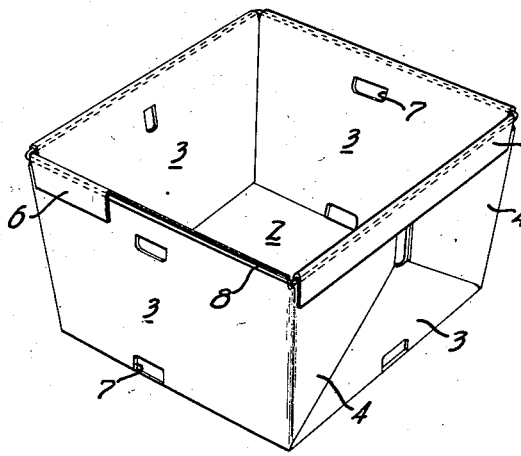
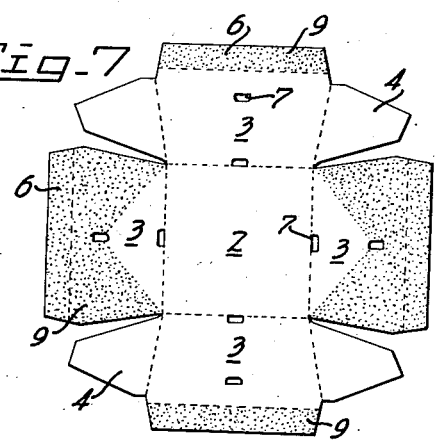
INVENTOR
CLAUDE M. STITT
BY Charles V. Evans
HIS ATTORNEY Jan. 18, 1938.  C. M. STITT  2,105,620
BOX MAKING MACHINE
Filed March 9, 1937  8 Sheets-Sheet 5
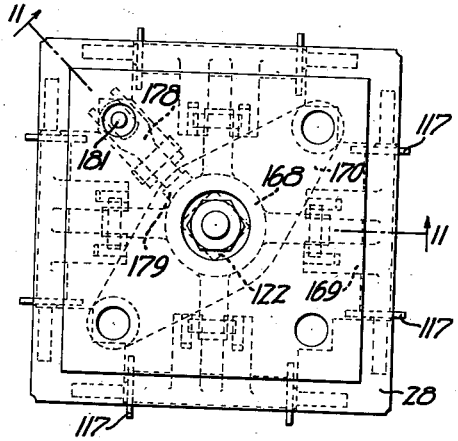
Fig.10
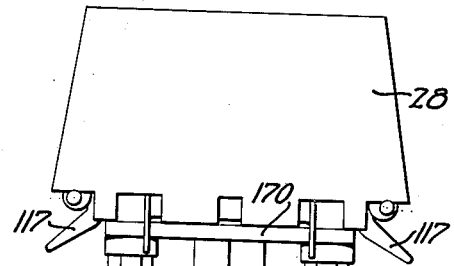
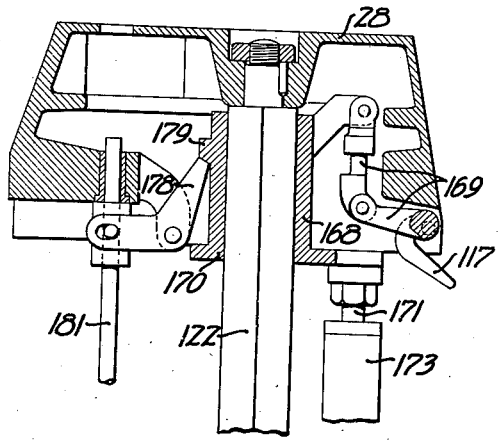
Fig.11
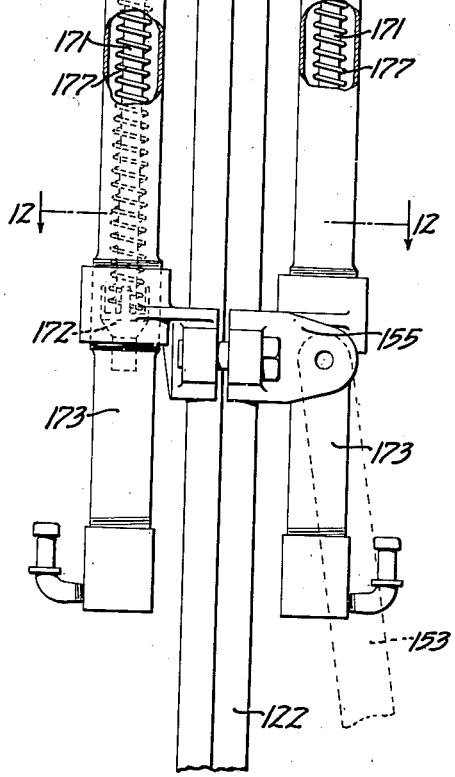
Fig.9
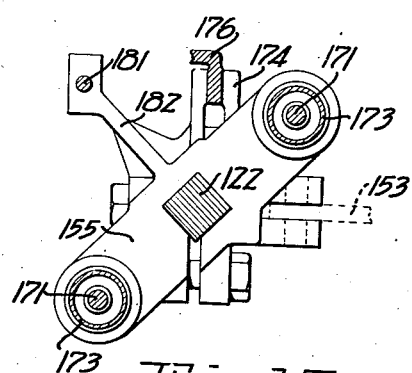
Fig.12
INVENTOR
CLAUDE M. STITT
BY Charles S. Evans
HIS ATTORNEY INVENTOR
CLAUDE M. STITT
BY Charles S. Evans
HIS ATTORNEY

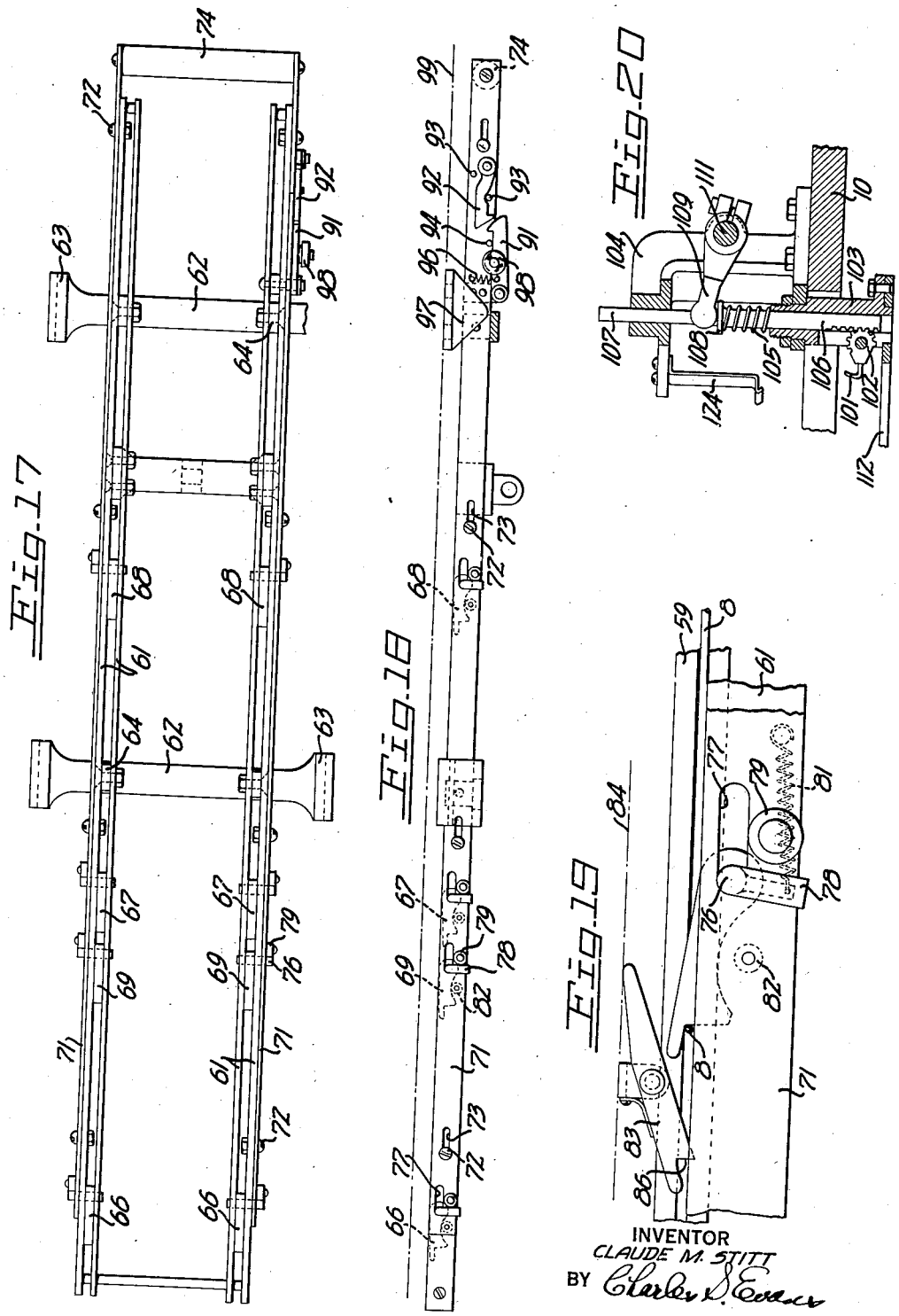

Jan. 18, 1938.                  C. M. STITT                  2,105,620
                            BOX MAKING MACHINE
                          Filed March 9, 1937              8 Sheets-Sheet 8
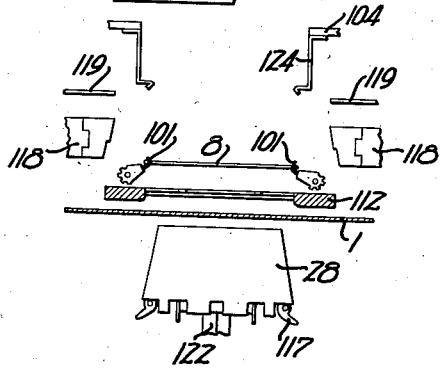
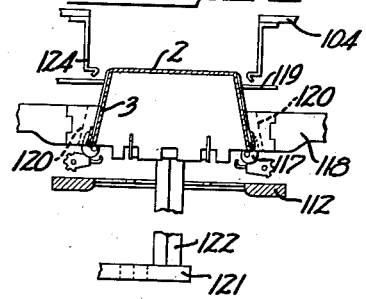
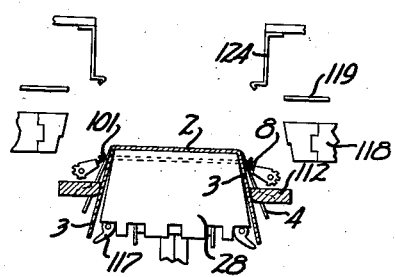
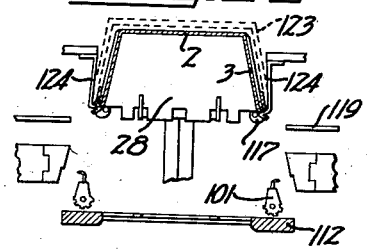
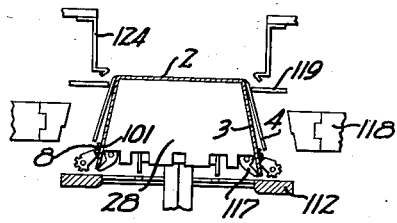
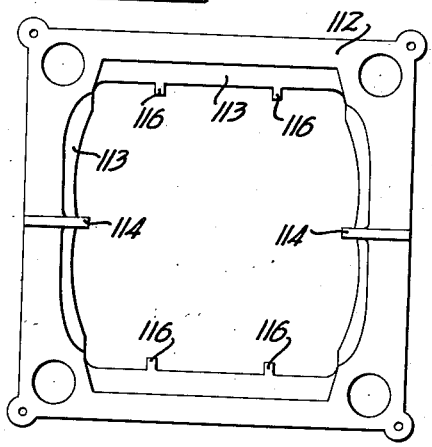
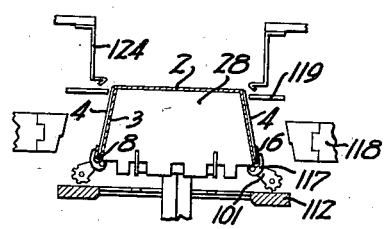
INVENTOR
CLAUDE M. STITT
BY Charles S. Evans
HIS ATTORNEY Patented Jan. 18, 1938

2,105,620

UNITED STATES PATENT OFFICE 2,105,620

BOX MAKING MACHINE

Claude M. Stitt, Antioch, Calif., assignor to Fibreboard Products, Inc., San Francisco, Calif., a corporation of Delaware Application March 9, 1937, Serial No. 129,882

17 Claims. (Cl. 93—49)

My invention relates to a machine for folding a box from a blank sheet of material; and the broad object of my invention is to provide means for applying a reinforcing ring to the box during the folding operation.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawings:

Figure 1 is a side elevational view of a machine embodying the improvements of my invention.

Figure 2 is a fragmentary view showing the gluing unit in side elevation, taken from the side of the machine opposite that shown in Figure 1, and illustrating the control switch for the wire feed solenoid.

Figure 3 is a plan view of the machine; and

Figure 4 is a vertical sectional view of the same, taken in a plane indicated by the line 4—4 of Figure 3.

Figure 5 is a fragmentary sectional view showing the forming head operating cam, taken in a plane indicated by the line 5—5 of Figure 6.

Figure 6 is an end elevational view of the machine, looking at the end from which the wire rings are fed.

Figure 7 is a plan view of the box blank; and

Figure 8 is a perspective view of the completed box, portions of a rim flap being broken away to show the wire reinforcing ring.

Figure 9 is a fragmentary view showing the forming head and mounting in side elevation, portions of dash pots being broken away to show the internal structure.

Figure 10 is a plan view of the forming head;
and

Figure 11 is a vertical sectional view of the same, taken in a plane indicated by the line 11—11 of Figure 10.

Figure 12 is a fragmentary horizontal sectional view, taken in a plane indicated by the line 12—12 of Figure 9, showing the mounting bracket on the forming head stem.

Figure 13:
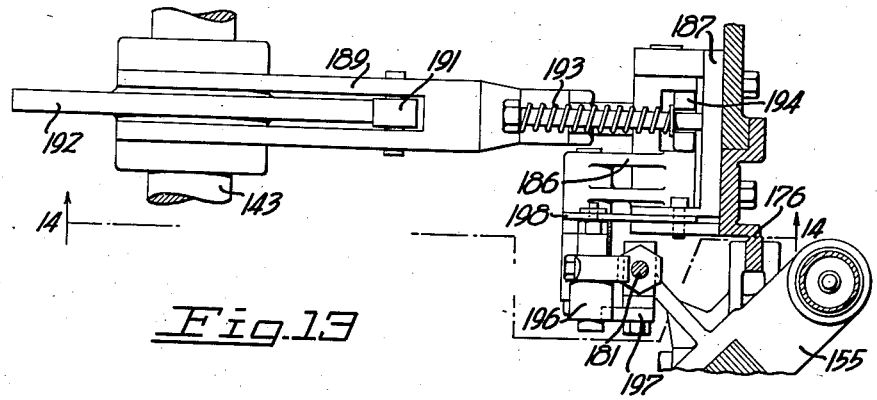
Figure 14:
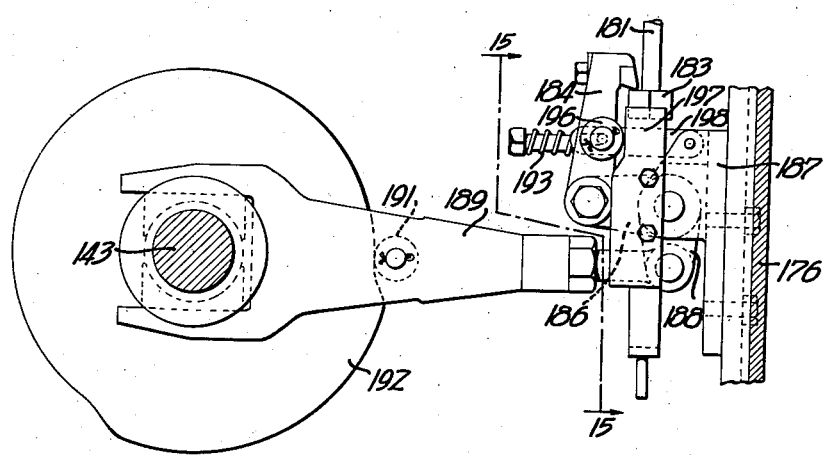
Figure 15:
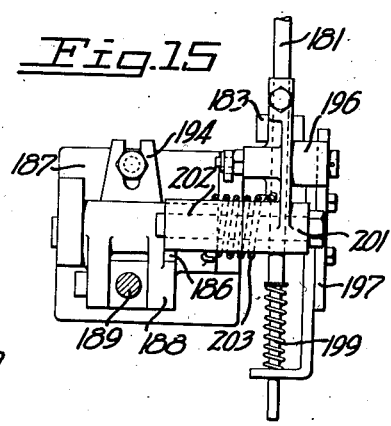

Figure 13 is a detail horizontal sectional view, taken in a plane indicated by the line 13—13 of Figure 4, showing the flap finger trip mechanism; and Figure 14 is a vertical sectional view taken in the plane indicated by the line 14—14 of Figure 13, showing a side elevation of the same mechanism; and Figure 15 is another vertical sectional view showing the trip mechanism, taken in a plane indicated by the line 15—15 of Figure 14.

Figure 16:
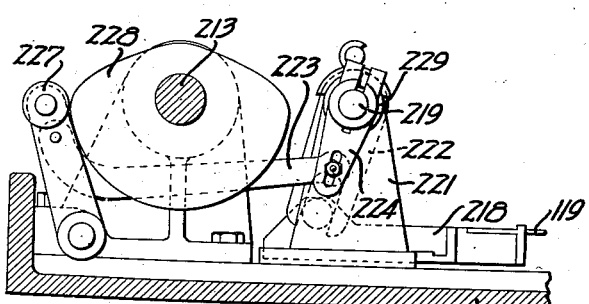

Figure 16 is a fragmentary vertical sectional view taken in a plane indicated by the line 16—16 of Figure 1, showing side flap holding mechanism.

Figure 17 is a plan view of the wire feed carriage; and

Figure 18 is a side elevational view of the same.

Figure 19 is a detail side elevational view on somewhat larger scale, showing one of the clamping fingers on the wire feed carriage, and also showing one of the wire latches.

Figure 20 is a vertical sectional view taken through one of the wire holding standards in the plane indicated by the line 20—20 of Figure 4, and showing the mechanism for operating the wire holding element.

Figures 21 to 26 are diagrammatic views showing various positions of the forming head and associated elements in the steps of folding the blank and placing the wire reinforcing ring.

Figure 27 is a plan view looking at the underside of the forming die.

In terms of broad inclusion, the box making machine embodying my invention is designed for folding a blank having a bottom wall, side walls foldably connected to the bottom wall, side flaps foldably connected to ends of the side walls, and rim flaps foldably connected to the tops of the side walls. The machine is also designed to place a reinforcing ring about the box walls, under the rim flaps. Broadly considered, the machine comprises a forming head; folding elements; and means for moving the head relative to the elements, whereby the walls are folded about the head to form the box, with the side flaps folded over adjacent side walls. Means are also provided for holding a reinforcing ring in the path of movement of the head, so that movement of the latter inserts the box through the ring to position the ring about the box.

Means are further provided for folding the rim flaps over the ring. A gluing device is provided on the machine for applying glue to the blank, so that when the box is folded the side and rim flaps are cemented down. Means are also provided for feeding blanks and reinforcing rings to the forming head; and means are provided for receiving the finished boxes.

In greater detail, and referring particularly to Figures 7 and 8 of the drawings, the machine embodying my invention operates to form a box from a blank 1 having a bottom wall 2, side walls

3 foldably connected to the bottom wall, side flaps 4 foldably connected to the ends of two opposing side walls, and rim flaps 6 foldably connected to the tops of each of the side walls.

Figure 8 shows the completed box with side walls 3 folded up from the bottom wall, and side flaps 4 folded in against the outer surfaces of adjacent side walls. Suitable openings 7 are preferably provided in the box to provide for ventilation.

Figure 8 also shows the reinforcing ring 8 encircling the upper portions of the side walls, with the rim flaps 6 folded down over the ring. This ring is preferably of wire, welded at the ends to form a ring, and is shaped to fit snugly along the rim of the box.

As shown in Figure 7, an adhesive 9 is provided on the side walls to cement the side flaps 4, and also along the inner surfaces of rim flaps 6 to cement the latter against the side walls. By this construction the reinforcing ring 8 is securely held, and the latter gives rigidity to the box, especially along the rim where strength is needed. In open top boxes, such as the berry basket disclosed, the reinforcing ring has been found to materially improve the box, since it holds the box in shape and permits rough handling without danger of breaking or tearing the walls.

Referring particularly to Figures 1, 3 and 6, the machine for folding the box and applying the reinforcing ring comprises a bed plate 10 supported by side frames 11 and a central cross plate 12. The blanks are fed in from one end of the machine from a chute 13 mounted on a bracket 14 projecting from a frame extension 16, the latter being arranged somewhat below the plane of bed plate 10. This chute holds a stack of the blanks, and the latter are fed one at a time from the lower end of the stack by a pusher block 17. Feed rolls 18 engage the blank being pushed out, and discharge it onto a conveyor 19 which carries the blank forwardly into the machine.

The drive for both the pusher block 17 and feed rolls 18 is derived from the conveyor, through suitable gears 21. A clutch, not shown, is preferably interposed in the drive mechanism for the pusher block, and a suitable lever 22 is provided for operating the clutch, so that an operator may start or stop the block.

As blanks are fed forwardly by the conveyor they pass through a gluing unit 23 having a glue wheel 24 overlying a supporting roll 26. Details of this unit are not shown because they are described fully in the patent to Ford and Pittman, No. 2,000,325, issued May 7, 1935. In the present case this unit applies the adhesive 9 over certain areas of the blank as illustrated in Figure 7.

As best shown in Figure 4, the inner end of conveyor 19 terminates on a sprocket 23′. Ahead of this conveyor, and geared to it, is a feed roll 25 having above it a spring pressed roll 26. As the blanks pass off the end of the conveyor, they are engaged by these rolls and fed forwardly onto a support 27 overlying the forming head 28.

At the same time that a blank is being fed from one end of the machine, a wire reinforcing ring is fed from the other end. These rings are stored in a stack 30 on a rack extending upwardly from the floor and projecting horizontally over the bed of the machine. The rack comprises a tubular core 29 carrying four guide bars or rails 31 adapted to engage the inside corners of the rings for holding them in stacked position. The rings may then readily be moved up to the horizontal portion of the rack by the operator, and fed by hand over the end of the rack and onto a synchronized feeding device, hereinafter described.

The rack, as best shown in Figure 6, is turnably mounted on a base plate 32, so that it may be swung out when a new supply of rings are being threaded on the rack. A suitable latch 33 serves to hold the rack in a selected position. In order to facilitate threading the rings on the rack, means are provided for contracting the guide bars 31 at the forward end of the rack. For this purpose a sleeve 32′ is slidably mounted on a reduced end of the core 29, and is movably controlled by a lever 33 through a connecting link 34. The ends of the bars 31 are connected to the sleeve, so that they are pulled together when the sleeve is moved out. A head frame 36 is mounted on the end of the rack to guide the wires down when they are pushed off the end of the rack. This head is held by a nut 37 and is removed when additional wires are being threaded on the rack.

When the wire rings are pushed off the end of the rack, one at a time, by the operator, they fall into a pair of revolving star wheels 38 which are timed to drop the wires into the machine at the proper time. As shown in Figure 3, where the rack is omitted to clarify the view, the wheels 38 are mounted on an apron 39 of the frame, and are positioned in an opening 41 in the apron. When a ring drops down it lands on the inner horizontal flanges of the star wheels, and is fed down into the machine when the wheels make another quarter turn.

The wheels are geared to a shaft 42 which is rotated periodically by a Geneva star 43. See Figure 4. As better shown in Figure 3, the Geneva star is driven by a sprocket 44 through a clutch 46 controlled by a solenoid 47. As long as the clutch is engaged the wheels 38 are rotated, a quarter turn at a time, through the Geneva star. When solenoid 47 is energized however, clutch 46 is disengaged to stop the wire feed. This solenoid operated clutch is used as a safety device to prevent wires from being fed into the machine, should a blank become stuck or for some other reason fail to feed into the folding mechanism.

Figure 2 shows the safety switch operating element 49 mounted on the reset arm 51 of the gluing unit. When this arm is in its normal operating position, as shown, the switch operating element 49 is away from button 52 of the safety switch 53, and the latter is open. This switch is in circuit with solenoid 47, so that clutch 46 is normally engaged. However, when a blank is not passing through the unit, and the control fingers 54 are not held up, the release arm 56 moves in and allows bar 57 to drop, also switch operating element 49 to swing down.

This action of the gluing unit lowers its supporting roll away from the glue wheel when a blank is not passing through the unit, as fully described in the patent referred to. When arm 51 goes down, the switch operating element 49 swings down and depresses button 52 of the safety switch, thereby closing the circuit to energize the solenoid and disengage clutch 46 of the wire feed mechanism. By this arrangement a wire is allowed to feed into the machine only when a blank is going in.

Means are provided for delivering the wire rings from the feed wheels 38 to a position above the forming head 28. For this purpose a carriage 58 is mounted for reciprocation under the bed of the machine; in its retracted position the rear end of the carriage underlies the wire feed wheels 38, and in its extended position the forward end of the carriage overlies the forming head 28. Figure 4 shows the carriage in its retracted position. In their forward movement the wire rings are guided by grooved guideways 59 arranged adjacent each side of the carriage. See Figures 4, 6 and 19. As best shown in Figure 6, the carriage is mounted by flanges running in grooves cut in the outside edges of guideways 59.

Referring particularly to Figures 17 to 19, the wire carriage is formed by pairs of parallel side rails 61 mounted on spreader arms 62 carrying the flanges 63 which engage the guideways 59. The rails of each pair are spaced apart by lugs 64 on the spreader arms, to which they are fastened. In the spaces between the rails a series of pairs of wire engaging fingers 66, 67, 68 and 69 are pivotally mounted for movement from an elevated position (as in Figure 19), to a retracted position (as in Figure 18).

Fingers 66, 67 and 68 are spaced along the carriage to engage the forward edges respectively of three different wire rings. Since the forward ring on the carriage is delivered into the operating position above the forming head, it also has its back side held by the additional pair of fingers 69.

The fingers are opened and closed by a pair of outside slide bars 71 mounted on pins 72 fastened to the outer rails and passing through slots 73 in the slide bars. These bars are connected together at their rear ends by a roller 74, so that the bars move together. Pivot pins 76 of the fingers also extend through suitable slots 77 in the slide bars, and carry depending legs 78 adapted to be engaged by rollers 79 mounted on the slide bars. Suitable springs 81 are provided for holding the fingers down; and stops 82 are provided for limiting their closing movement.

By this arrangement, the fingers are simultaneously elevated when the slide bars move forward relative to the carriage, and retract when the bars slide back. Since the springs 81 are tending to hold the fingers closed, the slide bars are normally held back, unless some outside force acts to slide them forward.

The reciprocating movement of the carriage as a whole is such that the wire rings are advanced in three steps. In the first step the rear fingers 68 clamp down on a wire dropped from the feed wheels 38, and advance it forward a certain distance to engage spring pressed catches 83. Figure 19 shows one of these catches, mounted under the bed of the machine (indicated by the dot and dash line 84), and having notched forward ends 86 for receiving the wire. These catches pull the wire out from under the fingers when the carriage retracts, so that the wire stays in its advanced position in the guideways.

When the carriage retracts to pick up a second wire, the intermediate set of fingers 67 move back behind the wire first advanced, and move it ahead another step to a second pair of catches, similar to the catch 83 shown in Figure 19. In the next retracting movement of the carriage, the forward pairs of fingers 66 and 69 engage both the front and back sides of the leading ring and deliver it into its final position of rest above the forming head 28.

The means for elevating the fingers on the carriage when the latter is retracted comprises (Figure 4) a pivoted lever 87 having a follower roller riding on a cam 88 on the cross shaft 42 turned by the Geneva star 43. The curved rear end of this lever carries a roller 89 arranged to engage under the roller 74 of the finger control slide bars 71 of the wire carriage. When cam 88 presses the lever down roller 89 moves up to press the slide bars forward and elevate the fingers.

In order to hold the fingers up until the carriage moves forward sufficient to catch the wires under the fingers, a locking device is provided to hold the slide bars in their advanced position. This comprises (Figure 18) a pair of hooks 91 and 92 pivoted respectively to one of the side rails 61 and an adjacent slide bar 71. Hook 92 has a limited motion between two stops 93; and hook 91 is held up against a stop 94 by a spring 96. The position of the hooks is such that they are locked together when the slide bars are shifted forwardly by lever 87.

This open position of the fingers is maintained until the carriage moves forward just enough to engage the wires, at which time a fixed cam plate 97 presses down on a roller 98 on hook 91 to release the latch, allowing the slide bars to shift forward and clamp the fingers down on the wires. Figure 18 shows cam plate 97 fastened on the underside of the machine bed, which is indicated by the dot and dash line 99 in this view.

After a wire has been advanced into position overlying forming head 28, it is held by four hooked elements 101 mounted to rotate up into engagement with the inside corners of the wire ring. This holds the ring securely when the carriage is withdrawn, and leaves the central opening of the ring free and unobstructed for subsequent insertion of the box. As better shown in Figure 20, each of the hooked elements 101 is mounted on a gear segment 102 journaled in a hollow standard or post 103 secured to a yoke shaped bracket 104 on the bed of the machine.

The gear segment is rotated by a rack 106 slidable in the standard 103, and having a shank 107 projecting up out of the standard and slidable in the upper arm of the yoke shaped bracket 104. A spring 105 encircling the shank bears up against a washer 108 on the shank and serves to hold the wire holding element 101 in its open or down position. Motion is imparted to a pair of the wire holding elements by levers 109 fixed to a shaft 111 and having bifurcated ends engaging the rack shanks 107, so that when the levers move down, the elements 101 turn up. Two of these shafts are provided, one for each pair of wire holding elements, as is shown in Figure 3.

Referring again to Figure 4, it is seen that standards 103 extend down through an opening in the bed of the machine to position the hooked elements 101 below the path of the wire carriage. Another function of these standards is to provide support for die plate 112, which lies between the head 28 and wire holding elements 101, and just above the carton blank support 27. This die has an opening through which the head may pass, and is shaped to fold the blank about the head when the blank is pushed up through the die.

Figure 27 shows the underside of the die, and illustrates the shape of the inner edges of the die, which edges constitute the forming elements for folding the blank about the head. As there shown, the inner edges of the die are all cut under to provide sloping faces 113 for gradually bringing in the side walls of the blank. The two opposite edges which engage the tabbed walls are straight, but the other two edges are curved in order to swing in the end flaps 4. To further direct the folding, and give a smoother folding action, an inwardly projecting lug 114 is provided at the center of each of the curved edges. A pair of shorter lugs 116 are also provided on each of the straight edges.

Figures 21 to 26 show various stages in the formation of the box, as the blank is pushed up through the die plate and then past the wire holding elements and flap pressure mechanism. Figure 21 shows the position of the parts at the beginning of the folding operation. At this time the forming head 28 is down; a blank is positioned between the head and die 112; and a wire ring 8 is being held above the die by elements 101.

When head 28 moves up it engages the bottom portion 2 of the blank and pushes it through the opening in the die. The walls 3 of the blank are folded downwardly and inwardly by the action of the die, and the end flaps 4 are folded inwardly over adjacent side walls. Figure 22 shows the blank while the head is moving up through the die. At this time sides 3 have been forced down almost against the head by lugs 114 and 116, and flaps 4 are being rotated in by the curved surfaces 113.

As the head continues moving up it inserts the folded box through the wire ring 8 overlying the die, and the ring serves at this time to draw the side walls 3 and flaps 4 against the head. As the ring slips down over the box, plates 119 move in against the flaps 4 to hold these from spreading out from the head after the ring passes down off the flaps. After the head reaches the point where the rim of the box is opposite the wire ring (Figure 23), the rim flaps 6 are folded upwardly and inwardly about the ring. This folding is effected by fingers 117 pivotally mounted on the lower portions of the head. When these fingers swing up they clamp the rim flaps and also securely hold the ring which now lies in the fold of the flaps. See Figure 24. In this position of the head, which is its intermediate position of rest, its bottom is substantially flush with the lower edges of the pressure elements 118 which are slidably mounted on the bed of the machine. There are four of these elements, one on each side of the head.

Pressure elements 118 move inwardly against the rim flaps 6, and press the glued surfaces of the rim flaps against the walls 3 and end flaps 4, and also press the end flaps against the glued surfaces of the walls. After these elements have started their squeeze against the rim flaps, the wire holding elements 101 rotate down out of engagement with the wire. Since fingers 117 are still up, slots 120 are cut in the elements to receive the fingers. Considerable pressure is desirable on the rim flaps, to effect the proper seal, and therefore elements 118 are in the nature of quite heavy pressure blocks having sloping forward faces, complementary to the faces on the head. Slight grooves are also provided along the lower edges of these elements to allow for the extra thickness of the rim flaps. Figure 25 shows the pressure elements against the head and wire holding elements 101 folded down.

Since the inclined faces of the pressure elements tend to force the head down and put strain on the mechanism, a suitable wedge block 121 is slipped under stem 122 of the head at this time. This wedge block holds the head rigidly, and insures full pressure on the rim flaps when elements 118 move in.

After a predetermined interval, plates 119 and pressure elements 118 move back, and head 28 goes up to insert the box into a nest 123, as shown in Figure 26. In this upper position the rim of a newly formed box is caught by the flanges of suitable spring holders 124 mounted on brackets 104. When the head recedes, the box is pulled from under fingers 117 and stripped from the head, and is left nested in the stack 123. Before the head recedes, wire holding elements 101 fold up out of the path of movement of the head, as shown in Figure 26. After the head goes down these elements move back out to engage another wire.

The boxes keep building up in the nest 123 and finally enter a chute 126 supported above the bed of the machine by posts 127. See Figure 1. This chute guides the nest onto a horizontal shelf 128, from which boxes may be removed from time to time. A pair of spring holders 129 are also provided on the chute, for assisting in holding up the stack.

The drives for the various mechanisms are derived from a main drive shaft 131, having a handwheel 132 at each side of the machine. See Figures 1 and 6. A loose pulley 133 is mounted on the shaft, and is driven by a belt 134 from a suitable prime mover. This drive pulley is connected to shaft 131 by a clutch 136 which is controlled by levers 137 connected by cross rod 138 and arranged on the two sides of the machine. The clutch is also controlled from the end of the machine by a third lever 139 connected through a rod 141 and arm 142 to the cross rod 138. A second shaft 143, rotating at slower speed, is also provided in the machine, and is connected to shaft 131 by suitable gears 144.

As best shown in Figure 1, a drive chain 146 is connected between shaft 131 and the inner end of blank feed conveyor 19 for driving the latter; and a chain 147 is connected between shaft 143 and the gluing unit for driving it. This takes care of driving all the mechanisms on frame extension 16, since the blank feed block 17 and associated parts are drivably connected to the conveyor 19, as already explained.

Wire feed carriage 58 (Figure 4) is driven by a linkage 148 from shaft 143. A pair of cams 149 on this shaft engage followers 151 on a yoke portion 152 of the linkage, giving a positive reciprocating action to the carriage, and providing a rapid forward and back motion with an appreciable period of rest in the retracted position.

The folding head 28 has its square stem 122 slidable in the center plate 12 of the frame, and is reciprocated by a pair of pivotally connected arms 153; one of which is mounted on a cross shaft 154 and the other to a bracket 155 on the stem. Shaft 154 is in turn rocked back and forth by a linkage 156 carrying a follower 157 riding in the groove of a cam 158 mounted on shaft 143. Figure 5 shows this cam and linkage; and from the shape of the cam it is seen that the head moves up to a position of rest, after which it moves up still further, before returning down to its initial position. In other words, the head goes up in two steps, and down in one.

Wedge block 121, which goes under stem 122 when the head is in its intermediate position of rest, is shown in Figure 4 as slidable in plates 159, and connected to a bar 160 having a guide yoke 161 slidable on a shaft 162. The latter shaft is driven from shaft 143 by a chain 163, and carries a cam 164 engaging a follower 166 of the block supporting arm. Suitable springs 167 serve to hold the follower against the cam. This wedge block has an aperture, through which stem 122 normally extends; the block being pulled back under the stem only when the head is in its intermediate position of rest.

Flap folding fingers 117 on the head are operated by a sleeve 168 slidable on stem 122 within the head. Figures 10 and 11 show the detailed construction of the head, with fingers 117 connected to the center sleeve by links 169 so that the pivoted fingers are closed simultaneously when the sleeve moves down. The lower end of sleeve 168 terminates in a plate 170, to the opposite ends of which are connected a pair of depending rods 171 carrying plungers 172 of dash pot cylinders 173. See Figure 9.

These cylinders are mounted on stem bracket 155 so that they move with the head. Figure 12 shows the stem bracket with the dash pots arranged on opposite sides of the stem. This view also shows the guide arms 174 on the bracket, slidably engaging a plate 176 on the frame for holding the bracket in alignment. Referring again to Figure 9, a spring 177 is provided in each dash pot about the rods 171, and are compressed between the upper ends of the cylinders and plungers 172. This serves to force the finger sleeve 168 down when the sleeve is released; and a suitable fluid, such as oil, in the cylinders operates to let the sleeve down easy when the sleeve is released, so that the fingers close without violence.

The means for releasing the fingers when head 28 is in the position shown in Figure 24 comprises a bell crank latch 178 pivoted in the head. One end of this latch is caught under a lug 179 on sleeve 168, and the other end is connected to a trip rod 181. This latter rod extends downwardly and is guided by an arm 182 of stem bracket 155. The mechanism for depressing the trip rod is shown in Figures 13 to 15; and would normally also be shown in the section of the machine taken in Figure 4, but is omitted in the latter view for sake of simplicity.

Trip rod 181 carries a collar 183 engaged by a hook 184 pivoted to an arm 186 of a bell crank which in turn is pivoted to a bracket 187 on the machine. The other arm 188 of the bell crank is connected to a yoke 189 having a follower 191 riding on a cam 192 on shaft 143. A spring 193 bearing against a lug 194 on the bell crank opposite arm 188, serves to hold the follower against the cam. By this arrangement cam 192 operates to pull down hook 184 and depress the rod. This trips latch 178 and allows sleeve 168 to descend, thereby closing fingers 117.

After pulling down rod 171, roller 196 on the hook rides out on a fixed cam plate 197, allowing collar 183 to move up past the hook. A slotted arm 198 engaging the end of the roller pin limits movement of the hook. Upward movement of the trip rod when the hook is released is insured by spring 199. Since cams 197 and 192 both operate on hook 184, the hub 201 of the hook and boss 202 of arm 186 are connected by a coil spring 203, so that the arm and hook move together, but are also permitted a degree of relative movement.

The mechanism is timed so that fingers 117 are closed when the lower end of the head is opposite the wire ring, as shown in Figure 24. These fingers then stay closed until the head returns to its lower position, at which time plate 170 of sleeve 168 abuts a resilient pad 204 on cross plate 12 and forces the sleeve up thereby again holding fingers 117 open. Figure 4 shows the resilient pad for resetting the finger sleeve.

The mounting of pressure elements 118 is best shown in Figures 3 and 4. These elements are slidable in suitable guideways on the bed of the machine; one element being positioned on each side of the central opening of the bed through which the box moves in the folding operation. Each pressure element is moved back and forth by a bell crank 206 having one arm connected to the element by a rod 207, and carrying a follower 208 on the other arm riding on a cam 209. The reciprocating motion imparted to the element is made positive, in both directions, by a second follower 211 riding on another cam 212. This second follower is located at the pivot between the bell crank and rod 207.

Both cams are fixed on a shaft 213; there being four of these shafts rectangularly disposed on the bed of the machine to serve the four pressure elements. See Figure 3. Adjacent pairs of these shafts are connected together by bevel gears 214. A shaft of one of these pairs is driven by a chain 216 from shaft 143; and a shaft of the other pair is driven at the same speed by a chain 217 from shaft 131; so that all pressure elements move simultaneously. See Figure 1. The mechanism of course is timed to shift the pressure elements inwardly when the head is in the intermediate rest position shown in Figure 25.

Holding plates 119, two of which are provided, are also driven from shafts 213. These plates are mounted on slide pieces 218 arranged alongside pressure elements 118, and are also mounted in suitable guideways on the bed of the machine. As shown in Figure 16, a short shaft 219 is journaled above plate 119 on brackets 221, and carries depending forks 222 engaging the side pieces 218. A rod 223 connects a lever 224 on shaft 219 with a rocker arm carrying a follower 227 riding on a cam 228 fixed on shaft 213.

Forward movement of plate 119 is effected by a spring 229 coiled about shaft 219, which spring also serves to hold follower 227 against cam 228. This cam of course is timed to allow plate 119 to move in to hold end flaps 4 when the head has moved up to the position shown in Figure 23.

The drive for the wire holding elements 101 is also derived from the upper cross shafts 213. As shown in Figures 3 and 4, shafts 111 in brackets 104 each have an upstanding lever 231 connected to a rod 232 carrying a follower 233 riding in a groove of a cam 234 on an adjacent cross shaft 213. This cam so times the movement of the parts that racks 106 are moved down to engage holding elements 101 with a wire placed over the head by carriage 58; and to open the holding elements to release the wire after the pressure elements 118 have started applying pressure to the rim flaps. The cam also operates to fold up the wire holding elements out of the way of the head when the latter moves down.

Feed wheels 38 for the wire rings are also driven from one of the upper cross shafts 213. As shown in Figure 3, the drive sprocket 44 of the wire feed mechanism is connected to a jack shaft 236 by a chain 237; the jack shaft in turn being connected to an adjacent cross shaft 213 by suitable gears 238.

I claim:
1. A machine for making a box having a reinforcing ring, said box being formed from a blank having a foldably connected portion for fastening the ring to the box, comprising means for folding the blank into a box, means for applying the reinforcing ring to the box, and means for folding said fastening portion about the ring.

2. A machine for making a box having a reinforcing ring, said box being formed from a blank having side walls and a rim flap foldably connected to the top of one of the walls, means for folding said walls to form a box, means for applying the reinforcing ring to the upper portions of said walls, and means for folding the rim flap about the ring.

3. A machine for making a box having a reinforcing ring, said box being formed from a blank having side walls and a rim flap foldably connected to the top of one of the walls, means for folding said walls to form a box, means for holding the reinforcing ring, means for inserting the box through the ring to position the latter about the upper portions of the box walls, and means for folding the rim flap about the ring.

4. A machine for making a box having a reinforcing ring, said box being formed from a blank having side walls and rim flaps foldably connected to the tops of said walls, means for folding the walls to form a box, means for positioning the reinforcing ring around the outside of said walls adjacent the upper portions of the box, and means for folding the rim flaps outwardly over said ring.

5. A machine for making a box having a reinforcing ring, said box being formed from a blank having side walls, side flaps foldably connected to ends of the side walls, and rim flaps foldably connected to the tops of said walls, means for folding the walls to form a box, means for folding the side flaps over the outer surfaces of adjacent side walls, means for positioning the reinforcing ring around the outside of said walls adjacent the upper portions of the box, and means for folding the rim flaps outwardly over said ring.

6. A machine for making a box having a reinforcing ring, said box being formed from a blank, comprising a forming head, means for folding the blank about said head to form a box, means for holding the reinforcing ring, and means for moving the head to insert the box through the ring for positioning the latter about the box.

7. A machine for making a box having a reinforcing ring, said box being formed from a blank having a foldably connected portion for fastening the ring to the box, comprising a forming head, means for folding the blank about said head to form a box, means for holding the reinforcing ring, means for moving the head to insert the box through the ring for positioning the latter about the box, and means for folding said fastening portion about the ring.

8. A machine for making a box having a reinforcing ring, said box being formed from a blank having a bottom wall, side walls foldably connected to the bottom wall, rim flaps foldably connected to the tops of the side walls, a forming head, folding elements, means for moving the head against the bottom wall of the blank to drive the latter between said elements for folding the side walls about the head, means for holding the reinforcing ring in the path of movement of said head, whereby the box is inserted through the ring by movement of the head to position the ring about the box, and means for folding the rim flaps about the ring.

9. A machine for making a box having a reinforcing ring, said box being formed from a blank having a bottom wall, side walls foldably connected to the bottom wall, side flaps foldably connected to ends of the side walls, rim flaps foldably connected to the tops of the side walls, a forming head, folding elements, means for moving the head against the bottom wall of the blank to drive the latter between said elements for folding the side walls about the head and for folding the side flaps about adjacent side walls, means for holding the reinforcing ring in the path of movement of said head, whereby the box is inserted through the ring by movement of the head to position the ring about the box, and means for folding the rim flaps about the ring.

10. A machine for making a box having a reinforcing ring, said box being formed from a blank having a foldably connected portion for fastening the ring to the box, comprising means for applying glue to the blank for cementing said fastening portion when the latter is folded, means for folding the blank into a box, means for applying the reinforcing ring to the box, and means for folding said fastening portion about the ring.

11. A machine for making a box having a reinforcing ring, said box being formed from a blank, a forming head, means for feeding a blank to the head, means for folding the blank about the head to form a box, means for holding a reinforcing ring, means for feeding a ring to said holding means, and means for moving the head to insert the box through the ring.

12. A machine for making a box having a reinforcing ring, said box being formed from a blank, a forming head, means for feeding a blank to the head, means for folding the blank about the head to form a box, means for holding a reinforcing ring, means for feeding a ring to said holding means, means for mounting the head for movement to insert the box through the ring, means for holding a nest of the boxes, and means for continuing movement of the head to drive a newly formed box into said nest.

13. A machine for making a box having a reinforcing ring, said box being formed from a blank, a forming head, means for feeding a blank to the head, means for folding the blank about the head to form a box, a plurality of elements for holding a reinforcing ring, means for feeding a ring to said elements, means for moving the head to insert the box through the ring, and means for moving the elements.

14. A machine for making a box having a reinforcing ring, said box being formed from a blank, a forming head, means for folding the blank about the head, means for holding a reinforcing ring, means for moving the head to insert the box through the ring on the holding means to position the ring about the box, a carriage for feeding a ring to said holding means, and means for timing the movement of the carriage with said head.

15. A machine for making a box having a reinforcing ring, said box being formed from a blank, a forming head, means for folding the blank about the head, means for holding a reinforcing ring, means for moving the head to insert the box through the ring, a carriage for feeding a ring to said holding means, means for timing the movement of the carriage with said head, and means timed with the carriage movement for depositing a ring on said carriage.

16. A machine for making a box having a reinforcing ring, said box being formed from a blank, a forming head, means for folding the blank about the head, means for holding a reinforcing ring, means for moving the head to insert the box through the ring, a carriage for feeding a ring to said holding means, means for timing the movement of the carriage with said head, a rack for holding a supply of rings, and means timed with the carriage movement for depositing a ring on said carriage.

17. A machine for making a box having a foldably connected portion for fastening a reinforcing element to the box, comprising means for positioning the reinforcing element adjacent said fastening portion, and means for folding the fastening portion about the element.

CLAUDE M. STITT.